(12) United States Patent
Domonkos et al.

(10) Patent No.: US 11,852,266 B2
(45) Date of Patent: Dec. 26, 2023

(54) HIGH PRESSURE HOSE WITH IMPROVED FLEXIBILITY

(71) Applicant: ContiTech USA, Inc., Fairlawn, OH (US)

(72) Inventors: Imre Domonkos, Szeged (HU); Krisztian Juhasz, Szeged (HU)

(73) Assignee: ContiTech USA, Inc., Fairlawn, OH (US)

( * ) Notice: Subject to any disclaimer, the term of this patent is extended or adjusted under 35 U.S.C. 154(b) by 0 days.

(21) Appl. No.: 17/302,656

(22) Filed: May 10, 2021

(65) Prior Publication Data

US 2021/0356057 A1 Nov. 18, 2021

(30) Foreign Application Priority Data

May 13, 2020 (EP) .................................... 20174534

(51) Int. Cl.
*F16L 11/08* (2006.01)

(52) U.S. Cl.
CPC .................................. *F16L 11/083* (2013.01)

(58) Field of Classification Search
CPC .................................................... F16L 11/083
USPC ......................................................... 138/130
See application file for complete search history.

(56) References Cited

U.S. PATENT DOCUMENTS

| 2,973,783 | A | | 3/1961 | Boe |
| 3,729,028 | A | | 4/1973 | Horvath et al. |
| 3,866,633 | A | | 2/1975 | Taylor |
| 3,905,399 | A | | 9/1975 | Dunnet |
| 4,273,160 | A | | 6/1981 | Lowles |
| 4,343,333 | A | | 8/1982 | Keister |
| 4,384,595 | A | | 5/1983 | Washkewicz et al. |
| 4,431,034 | A | * | 2/1984 | Abdullaev ............ B29C 70/207 138/132 |
| 4,693,281 | A | * | 9/1987 | Creedon ............... F16L 11/083 138/DIG. 2 |
| 4,850,395 | A | * | 7/1989 | Briggs .................. F16L 11/083 138/124 |
| 4,860,798 | A | * | 8/1989 | Kovacs ................. B29C 53/665 138/133 |

(Continued)

FOREIGN PATENT DOCUMENTS

| GB | 2412953 A | 10/2005 |
| WO | 2012006998 A1 | 1/2012 |

OTHER PUBLICATIONS

European Search Report of EP 20174534.6 application dated Oct. 15, 2020 on which this application is based.

*Primary Examiner* — Craig M Schneider
*Assistant Examiner* — David R Deal
(74) *Attorney, Agent, or Firm* — Gregory Adams

(57) ABSTRACT

The present invention concerns a high-pressure hose comprising a liquid and gas tight inner liner made from rubber, plastic or thermoplastic elastomer, at least four helically laid reinforcing plies embedded in polymer material, and an outer cover layer made from rubber, plastic or thermoplastic elastomer, wherein adjacent reinforcing cable plies are directed in the same direction and the follow-up ply pair is laid in opposite sense. Additionally, the pitch of filaments of adjacent unidirectional reinforcement plies is the same and the number of filaments is equal or different. The present invention further concerns methods for the production of such hoses and the use of such hoses.

9 Claims, 3 Drawing Sheets

(56) References Cited

U.S. PATENT DOCUMENTS

| | | | |
|---|---|---|---|
| 5,131,325 A | 7/1992 | Blauvelt | |
| 5,205,567 A | 4/1993 | Quinlan et al. | |
| 8,479,777 B2* | 7/2013 | Weil | F16L 11/083 |
| | | | 428/36.9 |
| 8,539,985 B2* | 9/2013 | Weil | F16L 11/083 |
| | | | 138/125 |
| 10,458,573 B2 | 10/2019 | Burrowes et al. | |
| 2005/0241716 A1* | 11/2005 | Nagy | F16L 11/083 |
| | | | 138/123 |
| 2006/0127620 A1 | 6/2006 | Fisher | |
| 2006/0191587 A1 | 8/2006 | Gerez et al. | |
| 2011/0290362 A1 | 12/2011 | Weil et al. | |
| 2013/0112308 A1* | 5/2013 | Glejbol | F16L 11/083 |
| | | | 138/137 |
| 2014/0329035 A1 | 11/2014 | Tsunenishi | |
| 2018/0292030 A1* | 10/2018 | Burrowes | B32B 15/02 |
| 2019/0186656 A1 | 6/2019 | Kozak et al. | |

\* cited by examiner

HIGH PRESSURE HOSE WITH IMPROVED FLEXIBILITY

The present invention relates to bonded high-pressure hoses, which comprise a liquid and gas tight inner liner made from rubber, plastic or thermoplastic elastomer, at least four helically laid reinforcing plies embedded in polymer material, and an outer cover layer made from rubber, plastic or thermoplastic elastomer. Adjacent reinforcing cable plies are directed in the same direction, and the follow-up ply pair is laid in opposite sense. Additionally, the pitch of filaments of adjacent unidirectional reinforcement plies is the same and the number of filaments is equal or different. The present invention further concerns methods for the production of such hoses and the use of such hoses.

A brief description of the drawings is as follows.

In the context of the present specification the term "high-pressure hose (HP hose)" refers to operating pressures of 1.5 MPa or higher with a safety factor for burst of minimum 2.0.

Also, for the aspects of the present invention the hose is regarded a "bonded hose" in case the main reinforcing plies thereof are embedded in polymer material. These hoses may in specific cases also comprise partially bonded or unbonded layers.

Figure 1:
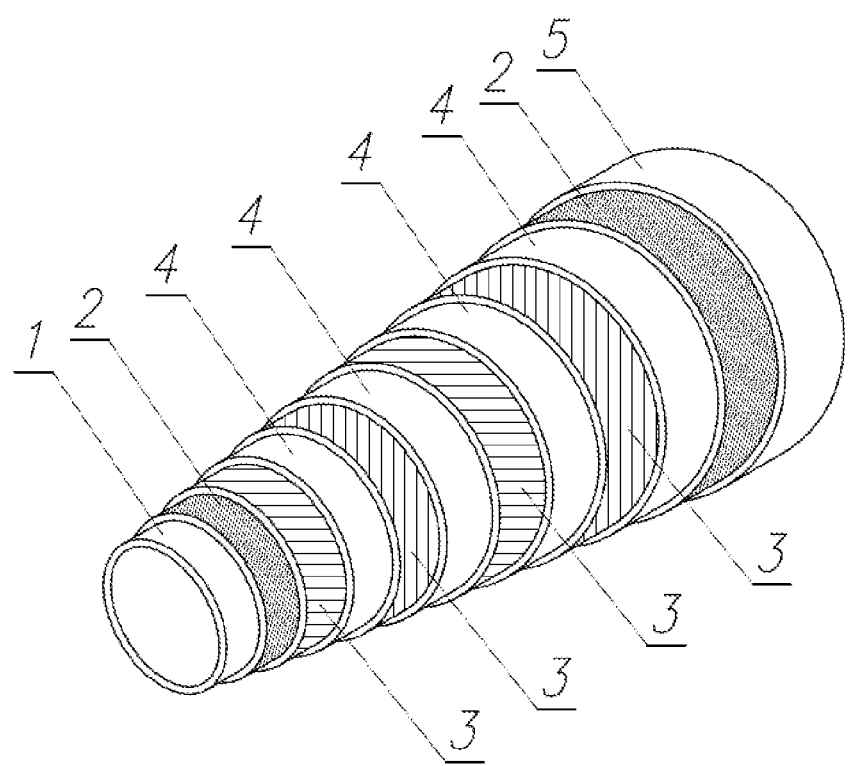
FIG. 1 shows the conventional use of reinforcement layer directions in hoses.

As it is known from the state of the art, high-pressure hoses are widely applied for conveying liquid and gaseous media. Among others, petroleum industry recommended practice API RP 17B $5^{th}$ Ed., as well as specification API Spec. 17K $3^{rd}$ Ed. are related to bonded hoses. An example of such hoses showing the conventional use of reinforcement layer directions is presented in FIG. 1. The major structural layers of bonded hoses are as follows:

A liner 1, constituting the liquid and gas tight layer of the hose, may be made from rubber, plastic or thermoplastic elastomer, and is usually (but not in all cases) in vulcanized adhesion to the layer above it. Rubberized textile plies 2, which are usually in vulcanized adhesion to the layers disposed below and above them. The textile material may be fabric or cord fabric made from natural or synthetic fibers. Reinforcing plies 3, constituting the main load bearing components, their material being steel wire, cable, or high-strength textile fibers, having a coating that provides adhesion between the reinforcing cable and the embedding polymer layer 4. The reinforcing plies are usually laid in a helical fashion, where the number of plies is at least two but may be higher. Embedding polymer layers 4, made from polymer material that provides adhesion between the reinforcing plies 3 after vulcanization. A cover 5, constituting the outer polymer layer of the hose, usually made from rubber but may also be plastic or thermoplastic elastomer, with a rubberized textile layer being often located below it.

In addition to these components high-pressure hoses may comprise a number of further elements such as internal stripwound tube, steel or composite helix, an outer stripwound armoring etc. Since these additional components are well known to those skilled in the art, they are not explained in further detail here.

Conventional high-pressure hoses comprise several layers of reinforcing plies and are manufactured with various ply structures. The main problem of hose constructions comprising helical plies is that the structures should meet several conditions simultaneously. Namely, the burst pressure should be as high as possible, the variation of length and twist should be minimal at operating pressure, while flexibility should be maintained. This goal is achieved by hose constructions according to prior art with a number of plies whose direction of lay is alternating left to right or right to left. In common hose designs flexibility is not the key design parameter and the hose lay angles are optimized for the highest burst pressure as possible.

In cases when low flexibility is required, until now, the technical solutions proposed have mainly focused on a reduction of the coverage of the individual plies and/or adjustment of the lay angles and/or using an odd number of reinforcing plies.

In many cases, the industry requires hoses with large bore size, and extremely high pressure rating and as low bending stiffness as possible. A lower bending stiffness eases the installation of respective hoses and also results in a lower force/momentum, which the hose applies on the connections. These competing requirements can only be fulfilled to a limited extend and with inevitable compromise.

Therefore, the objective of this invention was to provide a HP-hose having an improved flexibility, while at the same time being capable to withstand high working pressures.

Further, the manufacture of HP hoses according to the invention should be easy and be possible without any reconfigurations of state-of-the-art equipment for the production of HP hoses.

This objective is solved by a high-pressure hose according to claim 1. Accordingly, in a first aspect the invention provides a high-pressure hose comprising an inner liner, at least four helically laid reinforcing plies, and an outer cover layer, wherein adjacent reinforcing cable plies are directed in the same direction, and the follow-up ply pair is laid in opposite sense. Additionally, the pitch of filaments of adjacent unidirectional reinforcement plies is the same and the number of filaments is equal or different.

The way in which the reinforcing plies are applied in the inventive HP hose provides two-fold mechanical benefits in terms of flexibility. On the one hand, the shear stress in an embedding polymer layer between the plies with the same direction is removed since so-called "scissoring" is avoided or at least significantly reduced when the hose is bent. On the other hand, lower cable laying diameters can be obtained, which leads to lower second moment of inertia of the hose body hence reduced bending stiffness.

The high-pressure hose according to the invention has at least four reinforcement plies. While the maximal amount of reinforcement plies is not limited, from a cost perspective the number of plies is regular as low as possible to provide the required pressure resistance. Preferred high-pressure hose according to the invention comprises even number and at least four reinforcement plies but may be higher.

The material of the reinforcement plies is in principle not limited, as long as it provides sufficient strengthening of the hose. Suitable materials for reinforcement plies are e.g. polyamides, polyesters, rayon, polyethylene, aramids, glass, carbon, steel or aluminum.

The materials for each reinforcement ply can be used alone or in combination.

In a preferred embodiment of the inventive HP hose, the material in each reinforcement ply is the same and selected from helically wound steel wires, steel cables, double twisted steel wire ropes and/or aramid threads, preferably steel cables. The steel is preferably high modulus carbon steel.

In one embodiment, the inner liner comprises natural or synthetic rubber, plastic or thermoplastic elastomer.

The liner of the hose according to the present invention may be among the others be made from vulcanized rubber, such as ethylene-propylene copolymer (EPM), ethylene-propylene-diene copolymer (EPDM), nitrile rubber (NBR), (partially) hydrogenated nitrile rubber (HNBR), fluorine rubber (FPM or FKM), chloroprene rubber (CR), natural rubber (NR), styrene-butadiene rubber (SBR), isoprene rubber (IR), butyl rubber (HR), bromobutyl rubber (BIIR), chlorobutyl rubber (CUR), butadiene rubber (BR), chlorinated polyethylene (CM), chlorosulfonated polyethylene (CSM), polyepichlorohydrin (ECO), ethylene-vinyl acetate rubber (EVA), acrylate rubber (ACM), silicone rubber (MVQ), fluorinated methyl silicone rubber (MFQ), perfluorinated rubber (FFPM or FFKM) and/or polyurethane (PU). Identifiers commonly applied in rubber industry are given in parentheses.

The material of the liner of the hose according to the present invention may be plastic, including but not limited to various polyamides (PA), particularly PA-11 and PA-12, polyvinylidene fluoride and its copolymers (PVDF) and/or polytetrafluoroethylene and its copolymers (PTFE, ETFE, FEP, HFP, PFA, THV), polyethylene (PE), high-density polyethylene (HDPE) and crosslinked polyethylene (XLPE) or other similar materials.

The liners may also be made from thermoplastic elastomer (TPE) materials, such as thermoplastic polyolefin elastomers (TPO), thermoplastic polyurethanes (TPU) or other similar materials. Abbreviations commonly used in plastic industry to identify materials are given in parentheses.

In a preferred embodiment of the hose, the inner liner comprises vulcanized rubber.

The rubberized textile ply is made from a textile or cord fabric that completely or almost completely retains its advantageous properties during vulcanization process. The material of the textile or cord fabric may for instance be polyamide 6, polyamide 66, polyester, viscose, aramid, natural fibre etc., all of which are known to those are skilled in the art. The material may have substantially identical properties measured in the direction of the weft and warp threads, or a cord fabric having a strength several times higher in the warp direction than in the weft direction, as well as fabrics with properties falling between these two extremes.

In one embodiment, an embedding polymer layer is arranged between respective reinforcing plies in the high-pressure hose, so that the space between the filaments making up the reinforcing plies is filled with an embedding polymer material.

The embedding polymer layer preferably comprises at least one polymer, which is also used in the inner liner or the cover. This polymer can also be cross-linked or non-cross-linked, preferably the polymer is cross-linked.

In one embodiment, the cover comprises natural or synthetic rubber, plastic or thermoplastic elastomer. The cover may be made from the same materials as the liner.

The materials of the inner liner and of the cover may be the same or different.

In a preferred embodiment of the hose, the cover layer comprises vulcanized rubber.

Figure 2:
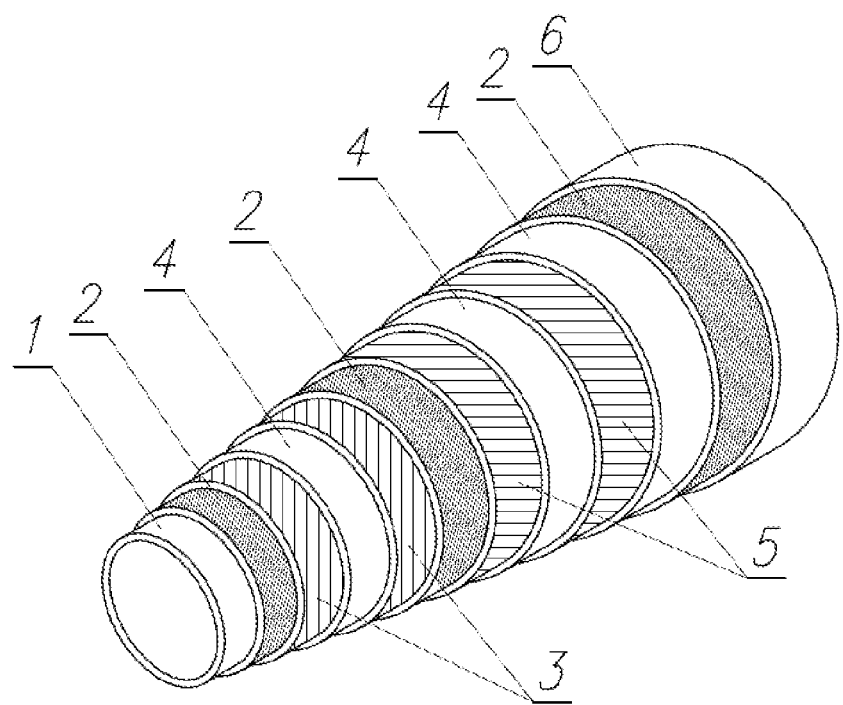
FIG. 2 shows a preferred embodiment of the hose according to the present invention comprising two pairs of reinforcing plies; and, FIG. 3 illustrates the cross-sectional view of a preferred embodiment of the inventive hose body.

FIG. 2 shows a preferred embodiment of the hose according to the present invention comprising two pairs of reinforcing plies.

A liner 1, made from flexible polymer material, being encompassed by a load distributing rubberized textile ply 2 (made from textile or cord fabric). The first pair of reinforcing plies 3 (made from steel cable) are laid in identical sense (i.e. left) to each other and an embedding polymer layer 4 is arranged between them to provide sufficient embedding. Another load distributing rubberized textile ply 2 is disposed above the first pair of reinforcing plies 3. The second pair of reinforcing plies 5 (made from steel cable) are laid in identical sense to each other, but in opposite sense (i.e. right) against the first pair of reinforcing plies 3. An embedding polymer layer 4 is arranged between the cable plies 5 and another embedding polymer layer 4 is disposed above the second pair of reinforcing plies 5. The hose is capped by a cover 6 that is reinforced by a rubberized textile ply 2.

Figure 3:
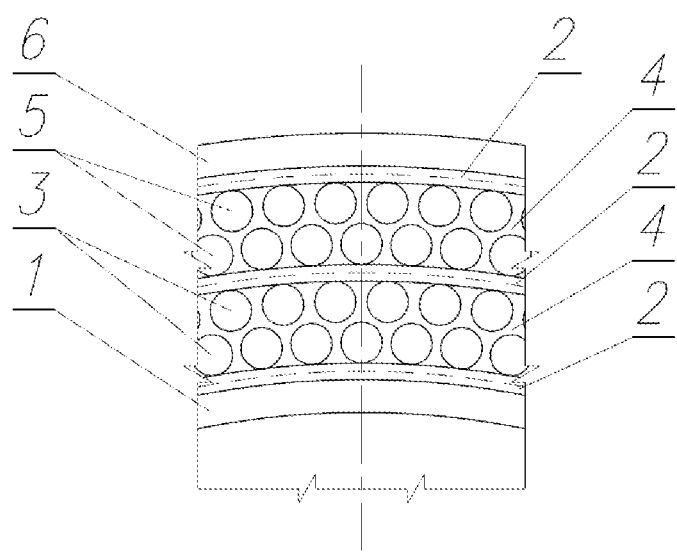

FIG. 3 illustrates the cross-sectional view of a preferred embodiment of the inventive hose body. The notation of structural elements is the same as in FIG. 2. The laying direction, the number and pitch of filaments in the first and in the second reinforcing plies 3 are the same. It is also true for reinforcing plies three and four 5. However, the pairs of reinforcing plies 3 and 5 are laid in opposite sense to each other. The embedding polymer layers 4 are arranged between adjacent unidirectional reinforcing plies in 3 and in 5 to provide sufficient adhesion between the plies. The thickness of embedding polymer layer 4 is designed to allow the closest position of adjacent reinforcing plies in 3 and in 5 as possible.

Regarding the manufacturing process, the high-pressure hose according to the invention is not subject to any special restrictions. The individual layers of the high-pressure hose according to the invention, such as the liner or the cover layer, can be manufactured by the usual methods known to the skilled person, such as in particular calendering or extrusion.

A second aspect of the present invention concerns a process for the manufacture of a HP hose, in particular a HP hose as described above, wherein the process comprises the steps of (i) providing an inner liner, (ii) applying thereon a rubberized textile ply, (iii) winding two unidirectional reinforcement plies in left (or right) direction in such a manner that an embedding polymer layer is arranged between them, (iv) applying a rubberized textile layer, (v) winding two unidirectional reinforcement plies in right (or left) direction in such a manner that an embedding polymer layer is arranged between them, (vi) applying thereon a rubberized textile layer, (vii) repeating steps from (iii) to (vi) depending on the total number of plies, and finally (viii) providing a cover layer on the reinforcement plies.

In a further aspect, the invention concerns a high-pressure hose, which is obtainable by the process as described above.

While the use of the high-pressure hose as described above is not limited in any relevant way, in a further aspect, the invention concerns the use of an inventive high-pressure rubber hose for oil-field hydraulic fracturing, well stimulation, riser or jumper, water injection, production, choke and kill, rotary drilling and cementing applications.

The invention is further explained by a non-restrictive example.

EXAMPLE

A prototype of the inventive HP hose for conveying water, has eight helically laid reinforcing plies made from steel cable. The inner diameter of the hose is 175 mm (7") and its operating pressure is P=103.5 MPa (15 000 psi). The four pairs of reinforcing plies are laid in opposite senses (i.e. left-right-left-right). The average lay angle of ply pairs decreases from 51° to 23° going from inside to outside. The outer diameter of the eighth ply is ~272 mm.

A prototype of the conventional HP hose for conveying water, has eight helically laid reinforcing plies made from steel cable. The inner diameter of the hose is 175 mm (7") and its operating pressure is P=103.5 MPa (15 000 psi). Each reinforcing ply is laid in opposite sense (i.e. left-right-left-right-left-right-left-right). The lay angle of plies decreases from 49° to 23° going from inside to outside. The outer diameter of the eighth ply is ~294 mm.

Comparing the outside diameter of the eighth reinforcing plies of the inventive and conventional HP hoses the difference is 22 mm, which means approximately 7.5% diameter decrease.

These prototype hoses were subjected to bending stiffness test at zero internal pressure and at different pressure levels up to 69 MPa (10 000 psi). The smallest bend radius was 2.4 m. Bending stiffness values of inventive and conventional HP hoses are compared at zero internal pressure and at 69 MPa (10 000 psi) pressure level considering only the minimum bend radius of 2.4 m.

The average bending stiffness value of three measurements at zero internal pressure was ~13.1 kNm$^2$ in case of inventive HP hose and ~17.6 kNm$^2$ for the conventional HP hose. Based on this approximately 25% flexibility improvement was found.

to Calculating the average bending stiffness at 69 MPa (10 000 psi) pressure level the corresponding values are ~108.8 kNm$^2$ and ~151.2 kNm$^2$ for inventive and conventional HP hoses, respectively. The flexibility improvement in this case is approximately 28%.

We claim:

1. A high pressure hose comprising:
   an inner liner encompassed by a load distributing rubberized textile ply;
   an embedding polymer layer arranged over the inner liner;
   a first pair of reinforcing plies encompass the embedding polymer layer;
   a second load distributing rubberized textile ply is arranged over the embedding polymer layer;
   a second embedding polymer layer is arranged over the second load distributing rubberized textile ply;
   the second embedding polymer layer is encompassed in a second pair of reinforcing plies;
   a third embedding polymer layer is arranged over the second embedding polymer layer;
   a third load distributing rubberized textile ply is arranged over the third embedding polymer layer;
   a reinforced cover is arranged on the third load distributing rubberized textile ply;
   the first pair of reinforcing plies each comprise eight helically laid reinforcing plies made from steel cable.

2. The hose of claim 1, the first pair of reinforcing plies arranged as four pairs laid in opposite senses, the average lay angle decreases from 51 degrees to 23 degrees going from inside to outside.

3. The hose of claim 2, an inner diameter of the inner layer of the hose is about 175 mm and the hose has an operating pressure of about P=103.5 MPa.

4. The hose of claim 1, wherein the reinforcing plies comprise double twisted steel.

5. The hose of claim 1, wherein the inner liner comprises one or more of natural rubber, synthetic rubber, plastic, and thermoplastic elastomer.

6. The hose of claim 1, wherein the embedding polymer layer comprises one or more of natural rubber, synthetic rubber, plastic, and thermoplastic elastomer.

7. The hose of claim 1, wherein a rubberized textile ply is arranged above the liner, below the cover and between the unidirectional reinforcing ply pairs.

8. The hose of claim 1, wherein the rubberized textile ply is made from one or more of a textile, cord fabric, polyamide, polyester, viscose and aramid.

9. The hose of claim 1, wherein the cover comprises one or more of natural rubber, synthetic rubber, plastic, and thermoplastic elastomer.

* * * * *